United States Patent Office 3,297,050
Patented Jan. 10, 1967

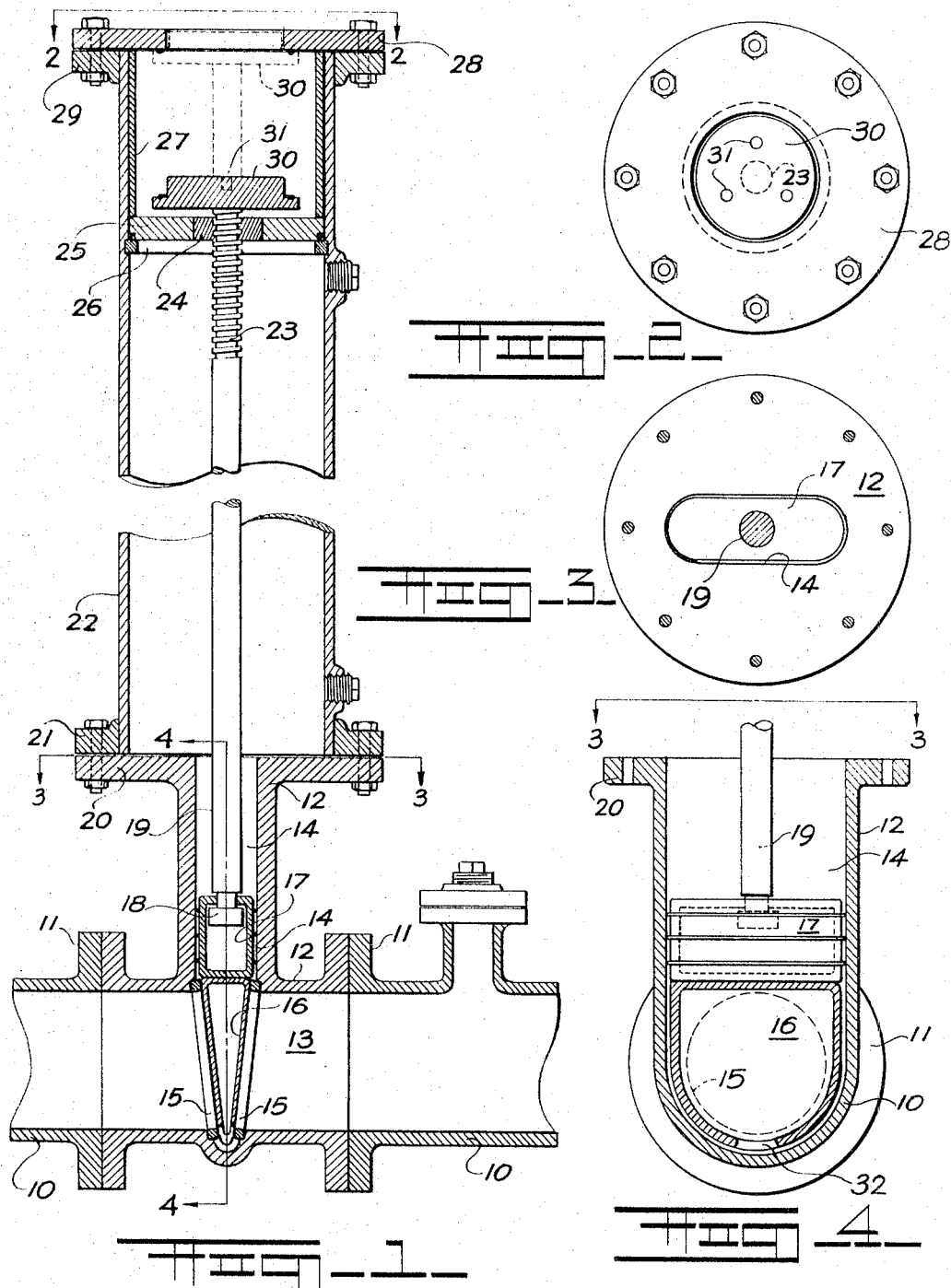

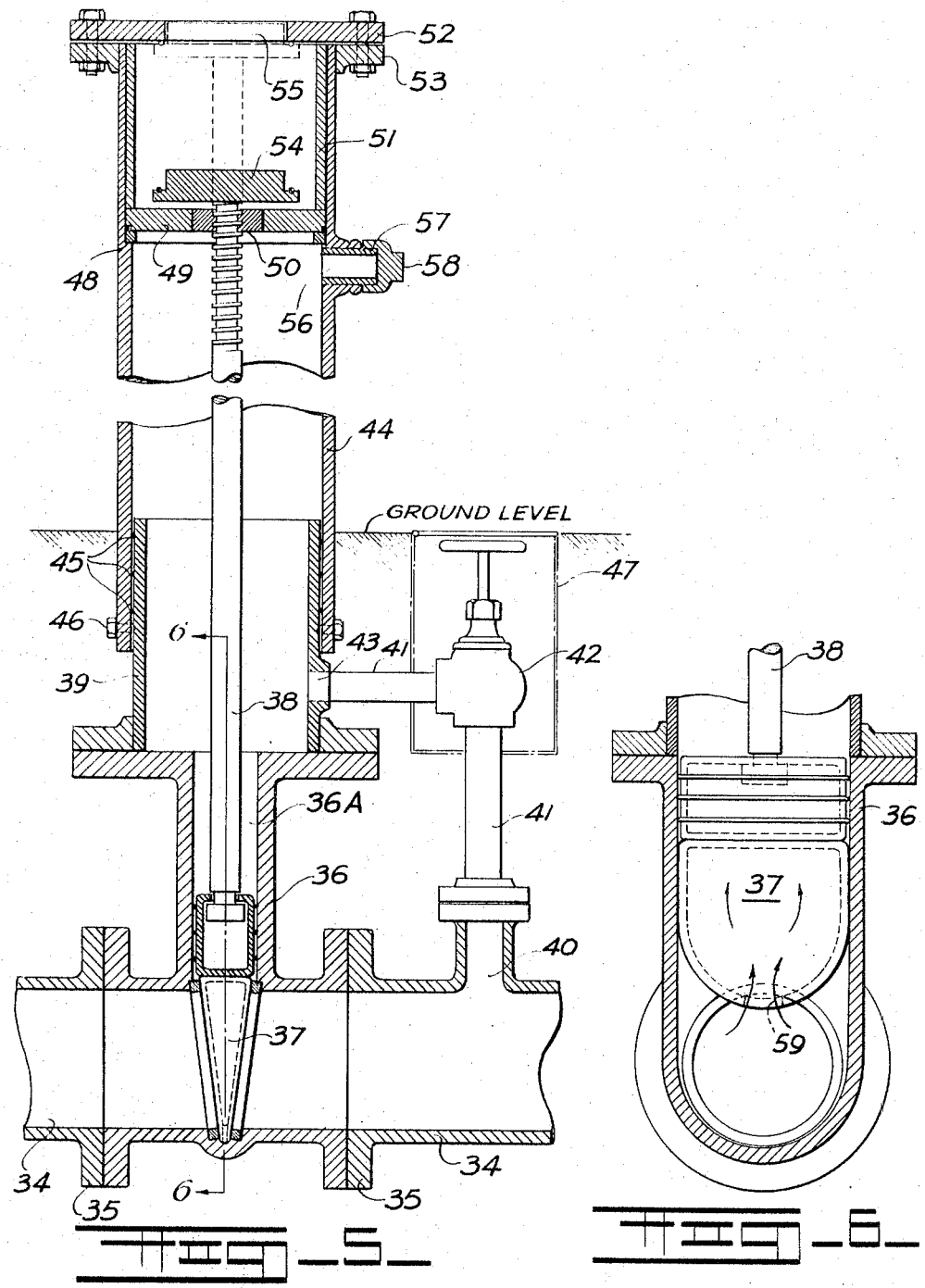

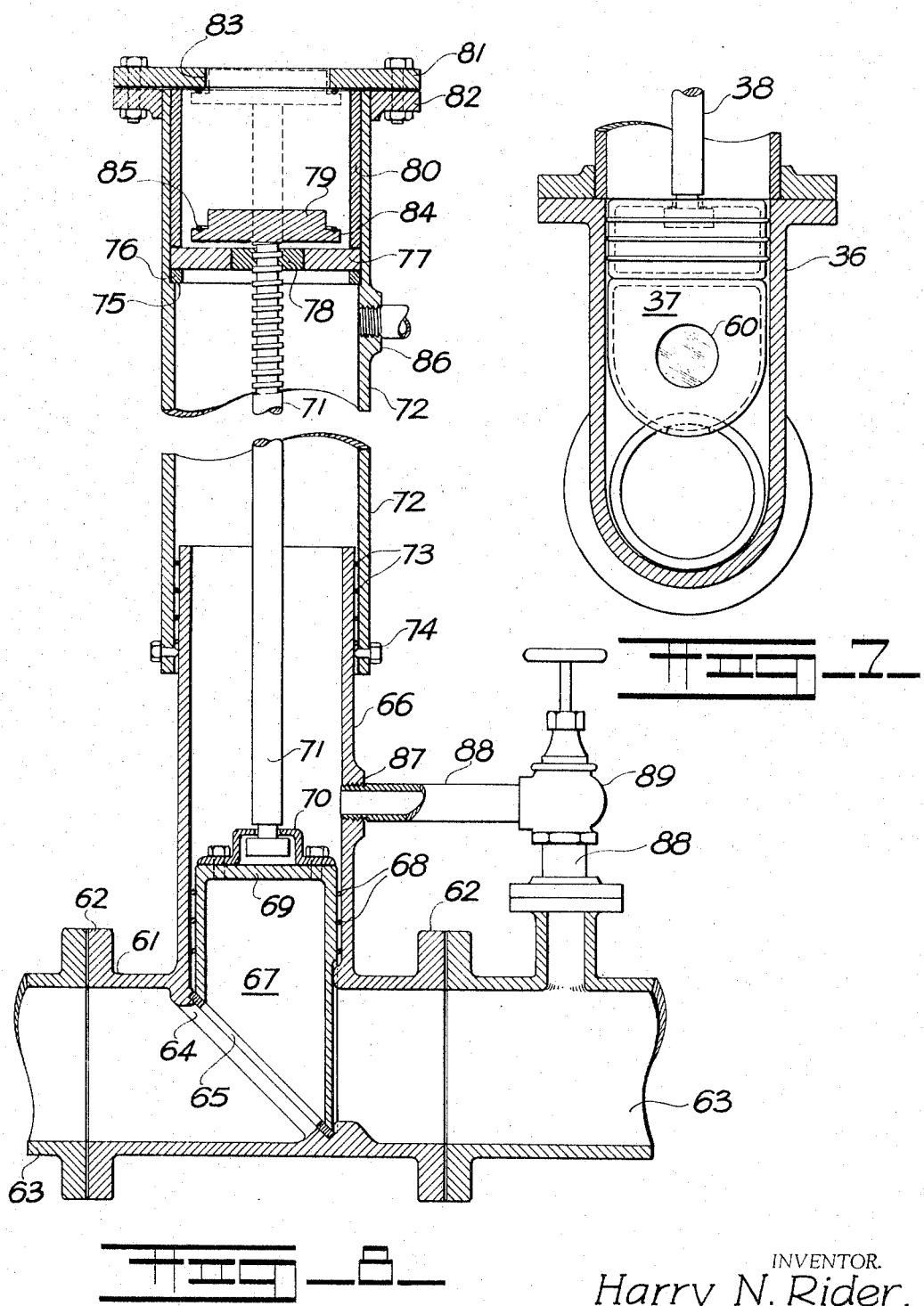

3,297,050
INDICATOR POST VALVE
Harry N. Rider, Youngstown, Ohio, assignor, by mesne assignments, to Automatic Sprinkler Corporation of America, Youngstown, Ohio, a corporation of Ohio
Filed Feb. 6, 1964, Ser. No. 343,086
6 Claims. (Cl. 137—556)

This invention relates to a valve and more particularly to an indicator post valve which may be installed in a fluid line or the like at some distance below the ground level and controlled by a mechanism extending into a post at or above ground level with a portion thereof indicating whether or not the valve is in open or closed position.

The principal object of the invention is the provision of an improved indicator post valve in which the post or upper portion is so arranged as to permit removal of the contents of the valve therebelow for repair or replacement.

A further object of the invention is the provision of an indicator post valve which may be used as a hydrant.

A further object of the invention is the provision of an indicator post valve wherein the top of the post may be located at ground level or any position thereabove.

A still further object of the invention is the provision of an indicator post valve in which the actual valve structure may be used as a gate valve.

A further object of the invention is the provision of an indicator post valve in which the valve element is arranged to form a modified hollow piston movable by fluid pressure in the valve so as to prevent the valve from closing if accidentally detached from its mechanical actuating means.

The indicator post valve disclosed herein comprises an improvement in the art relating to such valves in that a construction is disclosed which may be incorporated in a fluid line, for example, with a housing extending from a vertically movable valve element upwardly to or above the surface of the ground and so arranged that the device may be disassembled and the valve element removed and/or replaced without the necessity of digging up the whole valve as has heretofore been customary. A further advantage is found in the manner in which the actuating motion for the valve element is obtained in the construction disclosed herein wherein a transverse partition having a threaded aperture therein is located in the uppermost portion of the valve and a valve stem having a threaded upper end is engaged therein so that rotary motion applied to a special wrench affixed to a cap on the valve stem will open or close the valve element therebelow and move the cap to indicate the position of the valve element. The construction is such that by providing a bypass from the water main controlled in to the upper portion of the valve together with a hose connection in the post portion thereof the same may be used as a hydrant.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein:

FIGURE 1 is a vertical section through a portion of a water main and the indicator post valve installed therein.

FIGURE 2 is a top plan view on line 2—2 of FIGURE 1.

FIGURE 3 is a horizontal section on line 3—3 of FIGURE 1.

FIGURE 4 is a vertical section on line 4—4 of FIGURE 1.

FIGURE 5 is a vertical section through a modified form of the indicator post valve showing the same arranged for use as a hydrant.

FIGURE 6 is a vertical section on line 6—6 of FIGURE 5 showing the valve element in open position with arrows indicating modified piston action of fluid in the controlled line.

FIGURE 7 is a vertical section similar to FIGURE 6 showing a modification thereof.

FIGURE 8 is a vertical section through another modified form of the indicator post valve.

By referring to the drawings and FIGURE 1 in particular, it will be seen that an indicator post valve has been disclosed which as illustrated in FIGURE 1 is installed with its uppermost end at or near ground level and its lower portion engaged in a fluid line substantially therebelow. In FIGURE 1, the fluid line subject to the control valve is indicated by the numeral 10 and it will be observed that it is provided with flanges 11, 11 between which the flanged valve body 12 of the indicator post valve is positioned and secured as known in the art. The valve body 12 has a transverse chamber 13 therethrough with an opening 14 in the valve body communicating therewith and extending vertically thereabove. The valve body 12 is modified annularly on its inner surface by the provision of annular valve seats 15, 15 which are positioned in angular relation to one another as well as to the axis of the chamber 13 through the valve body 12. A hollow valve element 16 which is wedge shaped in cross section as seen in FIGURE 1 is positioned between said valve seats 15, 15 and is vertically movable relative thereto by means of a yoke 17 attached to its upper surface and which yoke is engaged on T-headed lower end 18 of a valve actuating stem 19.

By referring to FIGURES 1 through 4, it will be seen that the chamber 14 within the valve body 12 is oblong so that the valve element 16 may move vertically therein.

By referring to FIGURE 4 in particular, it will be seen that the upper portion of the valve element 16 is provided with square corners while the lower half thereof is formed on a radius matching the inner circumference of the valve seats 15. The upper end of the valve body 12 is flanged as at 20 and it is secured to the lower flanged end 21 of a hollow standpipe 22. The valve actuating stem 19 extends upwardly within the standpipe 22 and the upper end thereof is threaded as at 23 and engaged in a threaded portion 24 of a partition 25 positioned inwardly from the upper end of the standpipe 22 by an annular ring 26 and a sleeve 27. The sleeve 27 is retained in the position illustrated in FIGURE 1 of the drawings by a secondary apertured cap 28 which is attached by fasteners to an annular flange 29 on the upper end of the standpipe 22. A disc-like secondary cap 30 is secured to the upper end of the valve stem 23 above the partition 25 and when moved upwardly as shown in broken lines in FIGURE 1 registers with the aperture in the cap 28 so as to close the same.

By referring to FIGURES 1 and 2 of the drawings, it will be seen that the disc-like secondary cap 30 has a plurality of depressions 31 therein so that a special wrench (not shown) may be positioned therein and the secondary cap 30 revolved thereby. It will thus be seen that when the valve element 16 is elevated by revolving the secondary cap 30 from the position shown in the solid lines in FIGURE 1 to the position shown in broken lines therein the secondary cap 30 will effectively close the central aperture in the cap 28, and that, conversely, when it is desired to close the valve element 16 the secondary cap 30 will move downwardly thereby exposing the aperture in the cap 28 and thereby clearly indicating that the valve is closed.

It will occur to those skilled in the art that the length of the standpipe 22 may be any suitable length as it may be inexpensively custom sized by simply cutting off a suitable section of tubular material and affixing the flanges 21 and 29 thereto and at the same time altering the length of the valve stem 19 so as to match the finished length of the standpipe 22.

By referring now to FIGURE 4 of the drawings, it will be observed that the bottom of the hollow valve element 16 is provided with an opening 32 and that the valve element 16 is otherwise closed. At such time as the valve element 16 is in elevated relation or in partly elevated relation as when the valve is open, fluid in the line 10 and chamber 13 will readily enter the hollow valve element through the opening 32 and thus hold it upwardly in a piston-like action and particularly if it should become detached from the valve stem 19 as sometimes occurs. This feature of the invention insures against the accidental closing of the valve by breakage of the parts.

Modifications of the basic structure seen in FIGURES 1 through 4 of the drawings and hereinbefore described may be made within the scope of the invention so as to increase the utility thereof and permit alternate uses.

In FIGURES 5 and 6 of the drawings, one such desirable modification is illustrated in which a fluid line 34 flanged as at 35 is controlled by a valve including a valve body 36 having a movable valve element 37 therein. A valve element operating stem 38 is rotatably attached to the valve element 37 and extends upwardly through a cross sectionally oblong chamber 36A in the valve body 36 and into and through a cylindrical member 39 which is attached to the upper end of the valve body 36. An opening 40 in the fluid line 34 permits communication by way of a by-pass pipe 41 with a control valve 42 and an inlet opening 43 in the wall of the cylindrical member 39. A standpipe 44 is tescopically engaged over the cylinder member 39 and seals 45 are provided between the telescopically engaged surfaces, which seals 45 may comprise O-rings as illustrated. Fasteners 46 positioned through the standpipe 44 secure it in desired position on the cylindrical member 39.

In FIGURE 5 of the drawings, the ground level is illustrated and indicated by legend, and it will be observed that an enclosure 47 is positioned about the valve 42. The majority of the standpipe 44 is above the ground level and it is provided inwardly from its upper end with a shoulder 48 on which a disc-like partition 49 is positioned, the disc having a central threaded opening 50. A sleeve 51 is positioned within the upper end of the standpipe 44 and serves to hold the disc-like partition 49 in position. The sleeve 51 is held in position by a cap 52 secured by fasteners to an annular flange 53 about the upper end of the standpipe. A secondary cap 54 on the end of the valve stem 38 registers with the central opening 55 in the cap 52 when the valve is open as shown in broken lines in FIGURE 5. The side of the standpipe 44 is provided with an opening 56 and a threaded fitting 57 and a cap 58 which forms a delivery orifice of the hydrant or standpipe thus formed. In FIGURE 6 of the drawings, the valve element 37 is hollow and has an opening 59 in its lower end and is shown in elevated relation.

It will thus be seen that the modification illustrated in FIGURE 5 of the drawings permits the indicator post valve to be used as a control valve and as a standpipe or hydrant through which fluid, such as water, from the line 34 may be drawn.

A further modification of the valve may be seen by referring to FIGURE 7 which is a vertical section similar to FIGURE 6 and wherein the valve element 37 is provided with an additional opening 60 so that fluid pressure from the supply side of the valve body will enter the same at all times and tend to move the same vertically. This is particularly advantageous if the valve stem 38 should become accidentally disconnected from the valve element 37 or broken and in which event the valve element 37 would remain opened by reason of the fluid pressure directed thereinto or would move to open position.

Still another variation in the indicator post valve disclosed herein may be seen by referring to FIGURE 8 of the drawings which is a cross section and wherein a valve body 61 having oppositely disposed end flanges 62, 62 is positioned in a pipe line 63 as will be understood by those skilled in the art. The valve body 61 has a diagonally positioned circular valve seat 54 upon which an annular gasket 65 is positioned. A vertically disposed cylindrical extension 66 of the valve body 61 is positioned directly over the valve seat 64 and slidably receives a cylindrical valve element 67, the lower end of which is cut diagonally to match the diagonal positioning of the valve seat 64. A plurality of O-rings 68, 68 are positioned around the valve element 67 and its upper end 69 which is closed is provided with a yoke 70 which serves to rotatably engage the lower T-headed end of an operating shaft 71. The upper end of the cylindrical extension 66 telescopically engages the lower end of a standpipe 72 and a plurality of O-rings 73, 73 are positioned therebetween. Set screws 74 lock the standpipe 72 to the cylindrical extension 66 and the upper end of the standpipe 72 extends to the surface of the ground or thereabove as desired. An annular shoulder 75 is formed on the inner wall of the standpipe 72 inwardly from the upper end thereof and a ring 76 is positioned thereon which in turn supports a transversely disposed partition member 77 which has a central threaded orifice 78 therein through which the upper end of the shaft 71, which is threaded, extends. A disc 79 is secured to the upper end of the shaft 71, and it is provided with wrench-receiving configurations so that it may be rotated, which action will rotate the shaft 71 and cause the same to move vertically relative to the transverse partition member 77. Such action will cause the cylindrical valve element 67 to move vertically, and it will be observed that fluid pressure from the pressure side of the pipe line 63 will be exerted against the valve element 67 and that this pressure is sufficient to cause the valve element 67 to open and remain open in the event the shaft 71 should be disengaged or be broken.

Referring again to the upper end of the standpipe 72, it will be seen that a sleeve 80 is disposed within the same and positions the transverse partition member 77. A cap 81 secured by fasteners to an annular flange completes the standpipe structure, and it will be seen that a central opening 83 in the cap 81 is of a size so that the disc 79 which is provided with an annular shoulder 84 carrying an O-ring 85 will register in the opening 83 in water-tight sealing relation when the same is moved upwardly as shown in broken lines in FIGURE 8.

It will be observed that by providing openings in the standpipe 72 and the cylindrical extension 66, the interior of the standpipe may be used as a hydrant. This is accomplished by connecting the opening in the cylindrical extension 66 to the water supply pipe 63 and providing an exteriorly removable cap for the opening in the standpipe 72 as heretofore disclosed in connection with FIGURE 5 of the drawings.

In FIGURE 8 of the drawings, the opening in the standpipe is indicated by the numeral 86, the opening in the cylindrical extension 66 is indicated by the numeral 87, the pipe establishing communication between the opening 87 in the cylindrical extension 66 and the water pipe 63 is indicated by the numeral 88 and a control valve 89 is provided to control the hydrant thus formed.

It will thus be seen that in the modification illustrated in FIGURE 8 of the drawings and hereinbefore described, the valve element 67 is positively arranged to be moved to open position by water pressure in the line controlled thereby at such time as its controlling stem might be accidentally removed therefrom or broken. This construction insures against the accidental closing of the valve as is highly desirable when the same is used in a fire protection system.

It will occur to those skilled in the art that the water pressure entering the cylindrical valve element 67 will exert sufficient force to move the valve element 67 to open position and hold it in open position at all times except when it is forced into closed position by action of the shaft 71 and disc 79 applying motion relative to the standpipe portion of the device.

It will thus be seen that the indicator post valve disclosed herein meets the several objects of the invention, and having thus described my invention, what I claim is:

1. An indicator post valve for installation in a pipe line for controlling the same, said valve comprising a first valve body having spaced valve seats transversely thereof and a valve element movable relative to said valve seats, a stem attached to said valve element for imparting movement thereto and a secondary valve body secured to said first valve body and extending outwardly therefrom, a member removably positioned in said secondary valve body, said stem having a threaded section engaged in a threaded opening in said member and means on said secondary valve body removably positioning said member therein, said means comprising an apertured cap, a secondary cap for registry with said apertured cap, said secondary cap attached to said stem above said member and comprising means for imparting motion to said stem.

2. An indicator post valve for installation in a pipe line for controlling the same, said valve comprising a first valve body having spaced valve seats transversely thereof and a valve element movable relative to said valve seats, a stem attached to said valve element for imparting movement thereto and a secondary valve body secured to said first valve body and extending outwardly therefrom, said first and second valve bodies being larger than said valve element whereby said valve element may be removed therethrough, a member removably positioned in said secondary valve body, said stem having a threaded section engaged in a threaded opening in said member and means on said secondary valve body removably positioning said member therein wherein said secondary valve body has a hydrant opening therein and a valve controlled bypass extending between said pipe line and said secondary valve body.

3. An indicator post valve for installation in a pipe line for controlling the same, said valve comprising a tubular member having spaced angularly disposed annular valve seats therein, a chamber opening outwardly in the area between said valve seats, a hollow wedge shaped valve element arranged for movement in said chamber and between said valve seats, a valve stem for moving said valve element, a standpipe communicating with said chamber, said valve stem extending into said standpipe, a partition in said standpipe, said valve stem having a threaded end engaged in a threaded opening in said partition, a cap attached to said valve stem, configurations in said cap for receiving a wrench, a sleeve in said standpipe having one end positioned against said removable partition, a secondary cap on said standpipe positioned against the other end of said sleeve.

4. The indicator post valve set forth in claim 3 and wherein said valve element, valve stem, partition, sleeve and caps are arranged so as to be removable from said valve.

5. The indicator post valve set forth in claim 3 and wherein said valve has a bypass pipe between said pipe line and said standpipe and a hydrant outlet in said standpipe.

6. An indicator post valve for installation in a pipe line for controlling the same, said valve comprising a valve body having an angularly disposed annular valve seat therein, a cylindrical extension perpendicular to said valve body, a valve element reciprocably positioned in said cylindrical extension and arranged for movement toward and away from said valve seat, said valve element being of a configuration registrable with said angularly disposed annular valve seat, a standpipe engaged on said cylindrical extension, a member removably positioned in said standpipe, a stem threadably engaged in said member and having one end rotatably engaged on said valve element and means on said valve stem for rotating the same and wherein the said valve element is a hollow cylindrical member having a closed top and an open bottom.

References Cited by the Examiner

UNITED STATES PATENTS

| | | | |
|---|---|---|---|
| 601,967 | 4/1898 | Jones | 251—327 X |
| 954,437 | 4/1910 | Jacob | 137—369 |
| 984,111 | 2/1911 | Schmid et al. | 137—556 |
| 1,158,528 | 11/1915 | Meyer | 137—368 |
| 2,075,123 | 3/1937 | Lunken | 251—327 |
| 2,091,618 | 8/1937 | Szabo | 137—556 X |
| 2,683,581 | 7/1954 | Rovang | 251—327 |

M. CARY NELSON, *Primary Examiner.*

HENRY T. KLINKSIEK, *Examiner.*